UNITED STATES PATENT OFFICE.

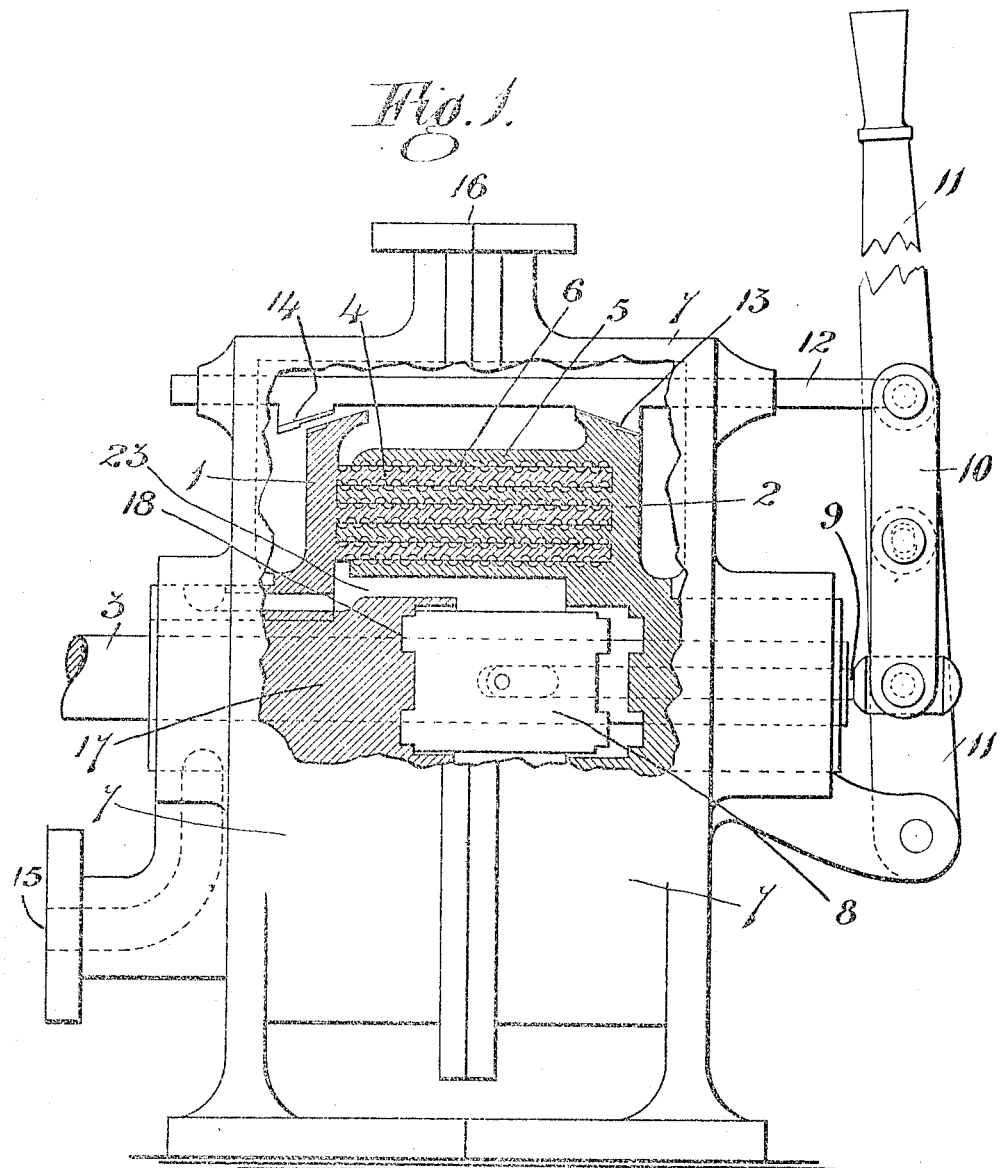

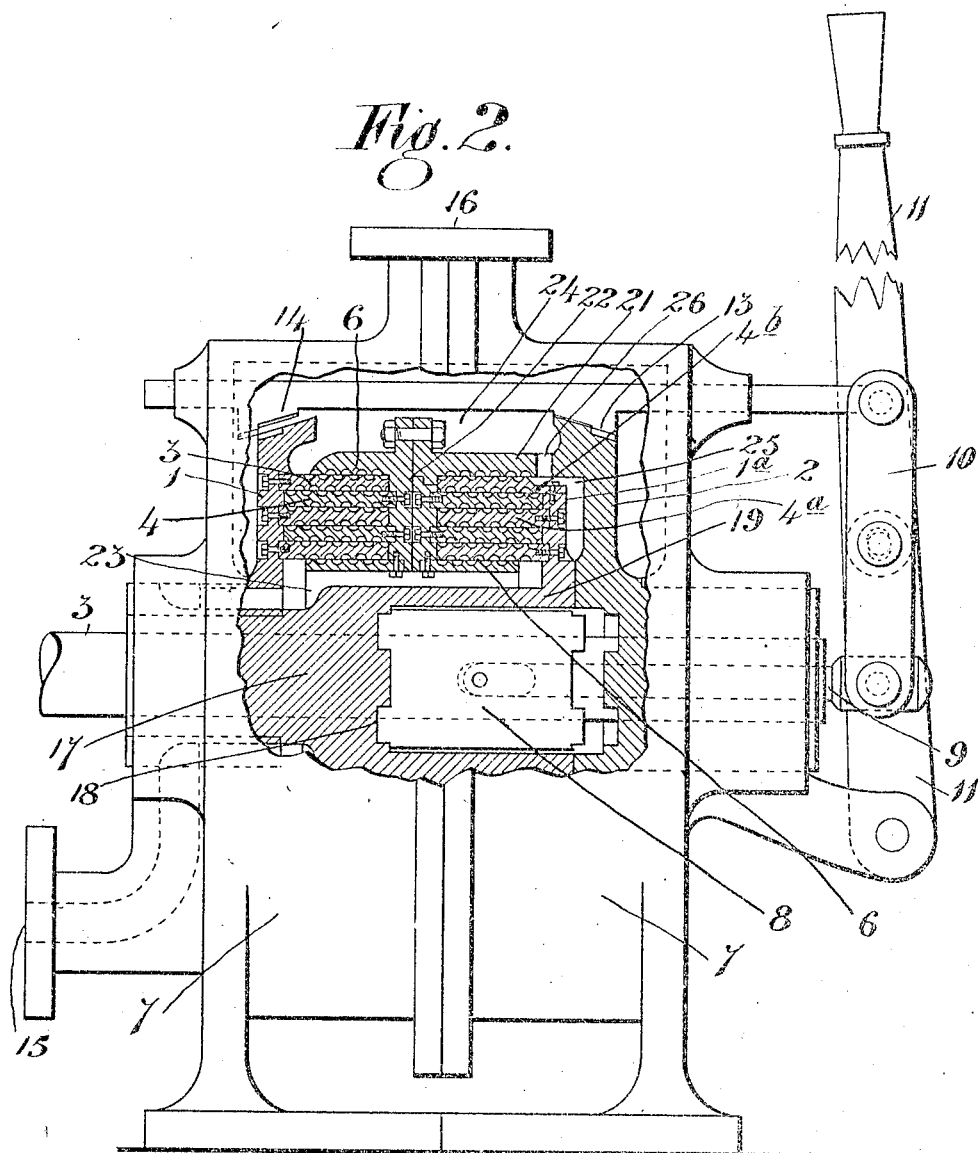

JOSEPH LEWTHWAITE, OF CHIDDINGLY, ENGLAND.

TURBINE.

No. 892,276.

Specification of Letters Patent.

Patented June 30, 1908.

Application filed November 8, 1907. Serial No. 401,350.

*To all whom it may concern:*

Be it known that I, JOSEPH LEWTHWAITE, a subject of the King of Great Britain, residing at Thorn Cottage, Chiddingly, Sussex, England, have invented certain new and useful Improvements in the Construction of Turbines, of which the following is a specification.

The object of this invention is the constructing of a turbine, so that by a simple movement of a lever, the direction of rotation can be reversed, thus enabling the turbine to run in two directions.

My invention will be clearly understood from the following description aided by the accompanying drawings in which:—

Figure 1. is a side view of a turbine with part of the casing broken away to show the interior construction which is in section. Fig. 2. is a similar view to Fig. 1 but showing a modified form of the interior construction.

According to this invention, I construct a turbine or rotary engine from two disks 1, 2, mounted loosely on an axle 3, and having projecting rings 4, 5, from their inside faces, which rings 4, 5, are provided with pockets or recesses 6 or the like on both faces.

The projecting rings 4, 5, of each disk 1, 2, are in engagement with each other as shown, and the pockets or recesses are of such a construction that the steam can pass along the meeting surfaces of the rings 4, 5, from one to another, the recesses 6 nearest the axle 3 being preferably smaller than those farthest from the axle, so as to allow of the full working of the steam, but such arrangement may be reversed, or the recesses be of the same size throughout.

The disks 4, 5, are situate in a casing 7, and the axle 3 also carries a clutch 8, which engages either of the disks 1, 2, and such clutch 8 is in connection by a rod 9 passed through a hollow portion of the axle 3, and connected to a rocking beam 10 pivoted on the operating lever 11, the other end of the rocking beam 10 being connected to the rod 12 carrying the brakes 13, 14, which act on the disks 1, 2. The steam is admitted near the axle 3, and exhausted from the casing at 16.

My invention in simple form is shown in Fig. 1, wherein each disk 1, 2, carries a single series of concentrically arranged rings, nesting with each other when in place, but in Fig. 2, I show two disks and a double web each carrying a set or series of concentrically arranged rings nesting with each other, which construction will effectually prevent any end thrust due to the action of the steam.

The disk 1 as in Figs. 1 and 2, is provided with a collar or portion 17, which encircles the axle 3, and is also shaped at 18 to receive the end of the clutch 8 so as to become engaged therewith, and revolve with the axle 3, but in the construction shown in Fig. 2, the collar is extended at 19 and provided at its end with a disk $1^a$ which carries the rings $4^a$ looking towards the rings $4^b$. In this construction, the disk 2 (also provided as is the case with the disk 1, with means for the clutch 8 to engage into to revolve same with the axle) is constructed with an extension wall or ring 21 from near its outer edge, the double web 22 being arranged on the inside of this wall 21 and arranged between the rings 3, $4^a$, said web also carrying concentric rings 4 and $4^b$, which mesh with the rings 3, $4^a$, the steam acting on two sets of rings instead of one.

In action, the lever 11 operating the clutch 8 and brake 13 is moved to start the machine, this action putting the clutch 8 into connection with one disk, say 1, and braking the other disk, say 2, so that it can form a resistance to the action of the steam, and as will be understood from the drawings, the disk 1, clutch 8 and axle 3 moving as one. The steam now enters the casing at 15, and passes to the space 23 around the axle 3 and collar 17, and then into the pockets or recesses 6, acting on the walls of the pockets of the movable disk 1, the walls of the braked disk 2 acting as a resistance, and moving the clutched disk and consequently the axle to drive the machinery, the steam passing through the pockets and sinuously between the rings until it reaches the chamber 24 surrounding the disks and rings, and away by the exhaust 16, by which time the steam has effected its maximum of power in propelling the clutched disk. In Fig. 2, the steam passes into a chamber 25 between the disks $1^a$ and 2 and into the chamber 24 by holes 26 in the wall 21. Thus the axle 3 is driven in one direction, and if it is desired to reverse the direction of travel of the axle, the lever 11 is operated to clutch the other disk, say 2, and brake the previous moving disk, say 1, when a reverse travel of the axle will take place, the steam acting as before, due to the disk 1 being braked, and the disk 2 being clutched to the axle 3 and rendered movable.

In some cases, the steam may be admitted to the casing and exhausted near the axle, and the sizes of the pockets may be gradually enlarged from the outside rings to the inside.

What I do claim and desire to secure by Letters Patent is:—

1. A turbine comprising a casing, a shaft therein, a plurality of revoluble fluid operated elements loosely mounted on the shaft and provided with a pair of concentric reversely tapered brake surfaces, a clutch for alternately connecting said elements to the shaft, brakes simultaneously movable axially of the elements and arranged to coöperate with said brake surfaces of the respective elements and movable simultaneously axially of said surfaces to hold one element and permit rotation of the other element, and a member for simultaneously setting the brake on one element and engaging the clutch with another element to operatively connect the latter to the shaft.

2. A turbine comprising a casing, a shaft, a pair of revoluble fluid operated elements having a pair of axially tapered brake surfaces, a pair of operatively connected brakes movable simultaneously in a direction axially of said elements for braking one element and releasing the other, and a clutch connected to operate with said brakes and serving to connect one element with the shaft while the other element is held by its respective brake.

3. A turbine comprising a casing, a shaft, a pair of revoluble fluid operated elements having oppositely tapered brake surfaces, a pair of brakes movable transverse to the plane of rotation of said elements for alternately engaging said brake surfaces, and a clutch for alternately connecting said elements to the shaft.

4. A turbine comprising a casing, a shaft, a pair of revoluble fluid operated elements provided with reversely tapered brake surfaces on their peripheries, a clutch for alternately connecting said elements to the shaft, brakes movable simultaneously axially of said elements and arranged to coöperate alternately with said elements, and an operating member connected to the clutch and brakes for connecting one element to the shaft and setting the brake on the other element.

5. A turbine comprising a casing, a shaft therein, a pair of fluid operated elements revoluble on the shaft and having coöperating rings having fluid passages for conducting the motive fluid in a direction radially of the shaft, reversely tapered brake surfaces on the peripheries of said elements, a pair of brakes connected to operate alternately on the brake surfaces of the respective elements, a clutch for alternately connecting the elements to the shaft, and a member connected to said brakes and the clutch for connecting one element to the shaft and setting the brake on the other element.

In testimony whereof I have hereunto set my hand in presence of two subscribing witnesses.

JOSEPH LEWTHWAITE.

Witnesses:
RICHARD CORE GARDNER,
LYNWOOD FADMAND GARDNER.